(12) United States Patent
Agar et al.

(10) Patent No.: US 7,654,151 B2
(45) Date of Patent: Feb. 2, 2010

(54) METHOD AND APPARATUS FOR MEASURING MULTI-STREAMS AND MULTI-PHASE FLOW

(75) Inventors: Joram Agar, Grand Cayman (KY); David Farchy, Bellaire, TX (US)

(73) Assignee: Agar Corporation Ltd., Grand Cayman (KY)

( * ) Notice: Subject to any disclaimer, the term of this patent is extended or adjusted under 35 U.S.C. 154(b) by 658 days.

(21) Appl. No.: 11/357,889

(22) Filed: Feb. 17, 2006

(65) Prior Publication Data

US 2008/0000306 A1  Jan. 3, 2008

Related U.S. Application Data

(60) Provisional application No. 60/679,365, filed on May 10, 2005.

(51) Int. Cl.
*G01F 1/86* (2006.01)
(52) U.S. Cl. .................................................. 73/861.01
(58) Field of Classification Search ............... 73/861.04, 73/861.18, 61.44
See application file for complete search history.

(56) References Cited

U.S. PATENT DOCUMENTS

| | | | |
|---|---|---|---|
| 5,589,642 A | 12/1996 | Agar et al. | |
| 5,741,977 A * | 4/1998 | Agar et al. | ............... 73/861.04 |
| 6,032,539 A | 3/2000 | Liu et al. | |
| 6,234,030 B1 | 5/2001 | Butler | ...................... 73/861.04 |
| 6,810,719 B2 * | 11/2004 | Dutton et al. | ............... 73/61.44 |
| 6,823,296 B2 | 11/2004 | Rey-Fabret et al. | |
| 6,941,254 B2 | 9/2005 | Duret et al. | ..................... 703/9 |
| 7,134,320 B2 * | 11/2006 | Gysling et al. | ............... 73/32 A |

* cited by examiner

*Primary Examiner*—Jewel Thompson
(74) *Attorney, Agent, or Firm*—Madan & Sriram, P.C.

(57) ABSTRACT

A method for correcting measurements of conventional flow meters is provided. Using prior determination of fundamental behavior parameters, flow meter measurements are iteratively calculated to improve their accuracy and eliminate the need for dissimilar momentum meters or moving parts in multiphase flow metering. In some applications, corrections to meter readings are made by using an algorithm having a generic model for the entire system and validating the converged solution against realistic bounds on fluid properties.

20 Claims, 6 Drawing Sheets

METHOD AND APPARATUS FOR MEASURING MULTI-STREAMS AND MULTI-PHASE FLOW

CROSS-REFERENCE TO RELATED APPLICATIONS

This application takes priority from U.S. Provisional Application Ser. No. 60/679,365 filed on May 10, 2005.

BACKGROUND OF THE INVENTION

1. Field of Invention

The present invention relates to apparatuses for measuring two-phase flow (liquid/gas) and three phase flow (liquid/liquid/gas) and related methods for reducing errors in the flow rate measurements.

2. Description of the Related Art

The application of the invention is to multiphase flow measurements in general. The teachings of the present invention can be particularly attractive for multiphase flow systems, where gas, oil and water are flowing simultaneously in the same pipe, at different velocities and concentrations.

In the last few years, many methods and apparatuses for multiphase flow metering were developed. These methods can be divided into two main groups:

Group A: Multiphase meters which are not relying on any separation devices.

Group B: Multiphase Meters where the flow is separated between gas and liquid streams, and a single-phase meter is used to measures each individual stream.

Continuous developments evolved, where the separation devices' size (hence performance) was reduced and multiphase meters are used in the mostly gas and the mostly liquid lines as described in U.S. Pat. No. 5,741,977 "High void fraction multi-phase fluid flow meter" Agar Joram, Farchi David, which is hereby incorporated by reference for all purposes. This eliminated the need for perfect separation.

The measurement of the multiphase flow in group A, utilizes an array of sensors in a single line. They rely on their difference in response to the flow, and therefore provide enough independent measurements for solving the unknown phases (oil, water and gas). A combination of momentum meters (ref. 1) is an attractive method for measuring two phase flow of liquid and gas because momentum meters (e.g. Venturi meters) measure the integral of fluid momentums (liquid and gas), and therefore are less sensitive to the homogeneity of the fluid stream. Momentum meters are also very accurate since the measurement is based on the differential pressure. Differential pressure sensors are known for their high accuracy and integrity. However, the requirement to use dissimilar momentum meters in order to get independent equations, is hard to fulfill. In reality, most momentum meters are quite similar in their behavior, since they are all based on Bernoulli's equation:

$$\Delta P = k \rho_{tp} \frac{Q_{tp}^2}{2A^2} (1 - \beta^4). \qquad \text{Equation 1}$$

Thus, what are needed are methods and systems for measuring multiphase flow rates that eliminate the need of making flow rate meters dissimilar. What are also needed are flow rate meters that do not use nuclear devices or moving parts.

SUMMARY OF THE INVENTION

The embodiments of the present invention use ordinary flow meters and apply the understanding of their fundamental behaviors in measuring multiphase fluid flow to improve their accuracy. The invention uses partial separation into mostly liquid and mostly gas streams measuring each leg separately. An additional measurement on a combined leg completes a set of three equations whose orthogonality (i.e., difference in response) is guaranteed by the difference in the gas volumetric fractions flowing through each leg.

Also, in accordance with one embodiment of the present invention, a methodology for addressing the errors in the flow meter models is specified in the form of intelligent regression and classification algorithms that are integrated into the iterative process that solves the system of equations. In aspects, the invention teaches how to automatically adjust each flow meter's coefficients and equations to correct errors caused by changes in the process itself, e.g. fluid density, viscosity, phase mixture, flow pattern, etc., all of which may fall outside the ordinary flow meter's calibrated range.

It is previously known from U.S. Pat. No. 6,032,539 a device uses phase separation into liquid and gas streams that intends to be 100 percent efficient to measure the gas stream flow rate with a gas flow meter and the liquid stream flow rate with another flow meter, both operating as single phase meters. To one skilled in the art of multiphase flow, it is clear that finite residence time and separation device size restrictions make 100 percent efficiency in separation impractical for continuous measurements and highly unlikely to achieve for a wide range of flow rates, flow patterns (e.g. slugging, wavy, foamy etc.), viscosities, surface tensions, etc. Certain embodiments of the present invention are different from the device described in U.S. Pat. No. 6,032,539 in that they only requires partial separation into a mainly gas leg and a mainly liquid leg.

One illustrative aspect of novelty of the present invention overcomes the need for perfect separation without using additional costly rotary equipment as described in U.S. Pat. No. 6,234,030 B1 where a 20 HP multiphase pump is required in the mainly liquid leg to boost the pressure and lower the gas void ratio in it. In this regard, certain embodiments of the present invention are much more practical as they requires no components with moving parts and no pumping power for its operation. The device shown in U.S. Pat. No. 6,234,030 B1 also sets a maximum limit of 20 percent by volume for the residual gas in the mainly liquid leg for the proper operation of the above mentioned multiphase pump. Other different aspects of novelty will be apparent to one skilled in the art.

Certain embodiments of the present invention are not limited to such a low percentage of gas in the mainly liquid leg. The device described in U.S. Pat. No. 6,810,719 B2, for instance, has a large drawback since it relies on the use of control valves to lower the gas content in the mainly liquid leg to below 2 percent by volume during the step that measures the liquid density at the preliminary stages of the iterative calculation described therein. Thus, the liquid density can not be continuously reported without operating the control valves. Embodiments of the present invention report all the measurements in real time, regardless of the presence of a flow pattern with significant circumferential and axial non-homogeneities. The use of momentum meters and the additional measurement of the combined leg in the present invention allows for better rangeability of the meter even under relatively low separation efficiency.

In aspects, the present invention substantially improves the multiphase measurement performance over widely changing flow regimes by teaching how to use the pressure drop in a momentum meter to calculate the instantaneous flow at every iteration step, without relying on average values of density as used in prior art. Another advantage is that it teaches how to validate the calculated values against an intelligent regression algorithm that seeks to avoid convergence towards spurious solutions.

The methods described in U.S. Pat. Nos. 6,823,296 B2 and 6,941,254 B2 are applicable only to the flow of multiphase mixtures of hydrocarbons through long distance transport pipelines. The restrictions and structure of the Multi-Layered Perceptron (MLP) and Kohonen networks are well known to those skilled in the art of non-linear neural network modeling of complex phenomena. The teachings of these prior references include a hydrodynamic neural network module that is fundamentally aimed at avoiding troublesome flow modes (e.g., terrain slugging) in pipelines. Said hydrodynamic module initiates its sequence with a regression neural network that has velocity slip and stratified flow fraction as outputs. Subsequently, a separate hydrodynamic classification neural network characterizes the flow mode to stratified, intermittent or dispersed based on the regression neural network outputs.

In aspects, the present invention teaches the implementation of intelligent regression and classification algorithms with neural networks as the preferred embodiment of said algorithms. The intelligent regression used in the present invention uses momentum meter pressure drop as an input (among several other flow parameters) and its continuous outputs are the flow rates of each phase flowing through a particular flow meter; said intelligent regression is substantially different from the prior art, since the flow rate outputs are subsequently compared with the relation established, from a physical set of equations, between flow meter pressure drop and flow rates as a means of validating the convergence of the closed loop iteration.

The intelligent classification used in certain embodiments of the present invention is different in that it determines flow pattern for specific flow meter geometries instead of flow patterns inside long distance transport pipelines. Said flow patterns inside flow meter geometries not necessarily correspond to standard flow modes inside conventional transport pipeline geometries. The approach used in certain embodiments of the present invention avoids restricting the regime classification to a few standard flow patterns. Accordingly, the pressure drop model for some patterns is refined by detecting further qualitative subdivisions within a particular pattern while some standard patterns are merged into a single category with a shared mathematical model for pressure drop. Thus, some embodiments of the present invention use the intelligent algorithm classification of flow pattern to specify the form and coefficients of the physical set of equations that characterize the pressure drop for each momentum meter.

The above-recited examples of features of the invention have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DETAILED DESCRIPTION OF THE INVENTION

Figure 1:
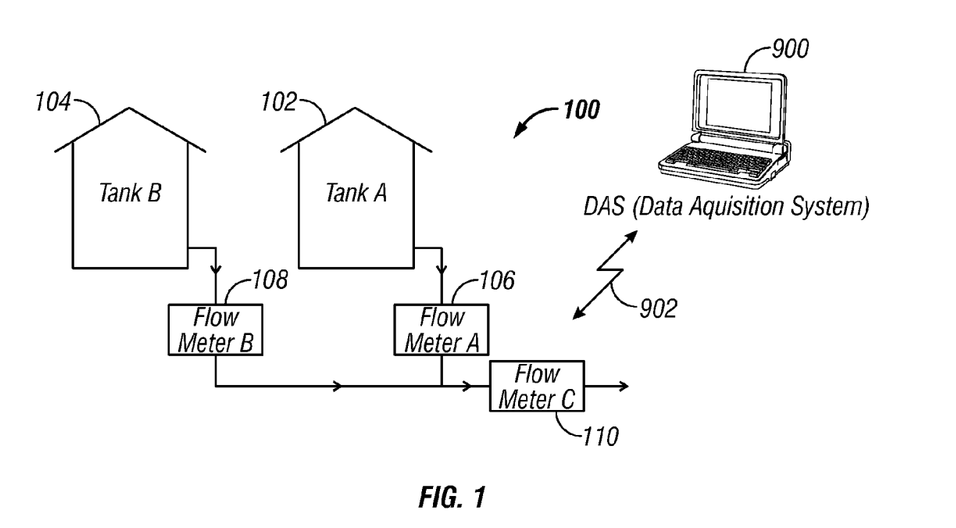
FIG. 1 schematically illustrates a system wherein three meters are used to measure flow from a tank farm.

Referring initially to FIG. 1, there is shown a conventional flow rate measurement system 100 that can benefit from the teachings of the present invention. In the oil and gas industry it is common to compare flow measurements of a plurality of lines to one commingled line, for example, comparing the measured flow of the sum of individual wells, with the field's total flow. Another example is comparing the flow out of different storage tanks with the pipe line fiscal flow meter. This duplicate measurement is very important for the integrity of the measurement. However, when the redundant measurement indicates a difference, it is very hard to determine which meter is the problematic one. Thus the only solution today is to check and prove all the meters involved. This solution is costly and time consuming. In many cases, the problem is not related to the instrument but to the process itself. System 100 includes two storage tanks 102 and 104, each having a flow line and associated flow meters 106 and 108, respectively. The fluid from the two tanks 102 and 104 commingles in a flow line where one flow meter 110 measures the combined flow from both tanks 102 and 104. If the sum of the readings of the tanks meters 106 and 108 matches the reading of the flowline meter 110, then it is assumed that all the meters 106, 108, and 110 are reading correctly, even though in reality the meters 106, 108, and 110 may have errors that canceled in the summation. When the sum of the readings of the tanks meters 106, 108 do not match the reading of the flow line meter 110, it is obvious that there is an error with one or more flow meters 106, 108, and 110.

In accordance with one embodiment of the present invention, the behaviors of the flow meters 106, 108, and 110 as well as their interactions are determined for a wide range of applications. The behavior can relate to physical characteristics of the meter or fluid properties such as viscosity and density. These prior determinations are use to find the correct reading of the meters 106, 108, and 110. For example, differential pressure flow meters generate errors when a fluid's viscosity and/or density change. A classic case for this problem is when the tanks 102, 104 each contain different types of oil (or other fluid). The tank meters 106, 108 will read correctly since the viscosity and density of each fluid are known. But the flow line meter 110 will read incorrectly because the viscosity and density of the combined fluid will change with the mixture concentration. Prior determination of the behavior of the meter 110 to a change in viscosity and density provides a database from which an initial value of a fluid property parameter such as viscosity or density can be selected. This initial value can be checked against the mixture proportion measured by the tank meters 106, 108. If the initial value does not match, within a given set tolerance, the measured mixture proportion, then the value can be iterated changed until density and viscosity are found. Advantageously, the prior determination of behavior can suggest the nature of the change in value (i.e., increase or decrease in value) and thereby avoid a random "hunting" for the correct value. The converged results are checked against preset boundaries. If results are within the preset boundaries, the measurement can be considered to be right. Otherwise the instrument is considered faulty.

Figure 2:
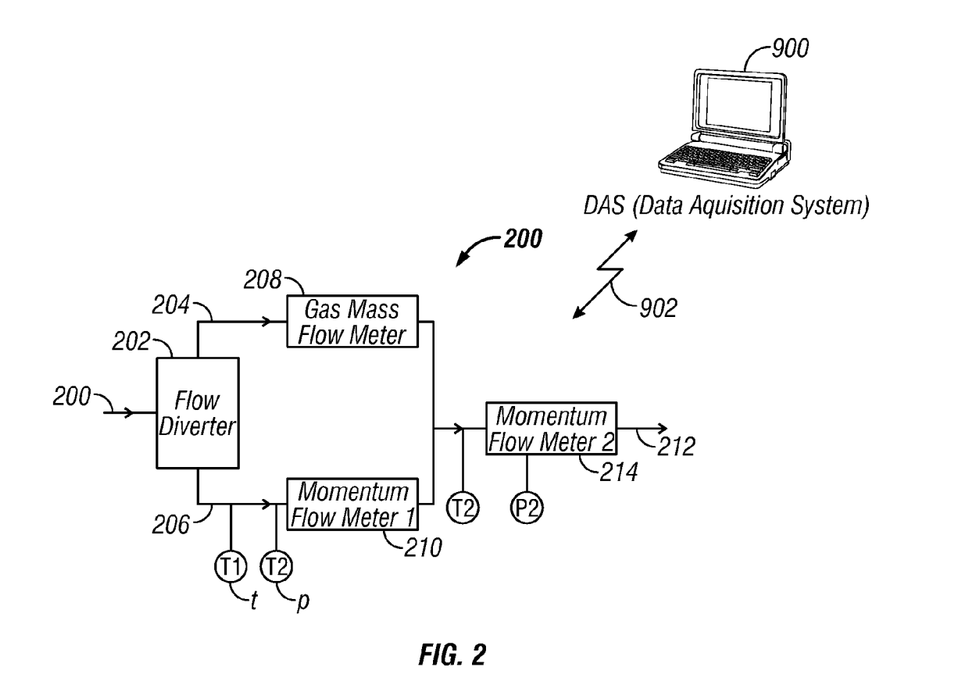
FIG. 2 schematically illustrates an exemplary system in accordance with the present invention wherein two phase flow of liquid and gas is measured using an fluidic flow diverter, a gas meter in the mainly gas leg, a momentum meter in the mainly liquid leg, and a momentum meter in the combined un-separated leg.

Referring now to FIG. 2, there is shown a system 200 for measuring two-phase flow of gas and liquid. The system 200 includes a flow separator 202 that forms a mainly gas stream or leg 204 and a mainly liquid stream or leg 206. The flow in the mainly gas leg 204 is measured with a gas flow meter 208 such as an orifice plate, Venturi flow meter, Coriolis meter or vortex meter. The flow in the mainly liquid leg 206 is measured with a momentum flow meter 210 such as a Venturi meter. The total "un-separated" fluid in a combined leg 212 is measured by a momentum flow meter 214. One of the mentioned momentum meters can also be replaced by other suitable meters such as a mass flow meter or volumetric flow meter. Additionally, other sensors such as temperature sensors T and pressure sensors P can be used in the system 200 as needed.

The mass flow rate measurement of the gas stream plus the mass flow rate measurement of the mainly liquid stream is equal to the mass flow rate measured with the momentum meter of the un-separated stream. This statement is correct only if the gas volume fraction of each leg 204, 206 and 212 is known correctly. In other words, by solving the three flow equations of gas leg flow meter 208, the liquid leg flow meter 210 and un-separated leg momentum meter 214, the individual liquid and gas flow rates can be found.

To solve for two unknowns, i.e., the gas flow rate and the liquid flow rate, two independent equations are needed as further discussed below.

With respect to the gas leg 204, $m_{GGL}$ is the gas mass flow rate in the gas leg 204.

$$m_{GGL} = P/RT \cdot Qvt \qquad \text{Equation 2}$$

where,

P—is the absolute pressure at the gas leg.

R—is the gas constant.

T—is the absolute temperature.

Qvt—is the volumetric flow rate measured by the gas volumetric meter.

The rest of gas and liquid is flowing in the mainly liquid leg 206. The total momentum of liquid and gas flow rate is measured by momentum meter 214. A Venturi meter is a suitable flow meter for this application. The equation for calculating the differential pressure in a Venturi meter is discussed in detail in CHISHOLM, D. Flow Of Incompressible Two-Phase Mixtures Through Sharp-Edged Orifices. Journal Of Mechanical Engineering Science, Vol. 9, No. 1, 1967. MURDOCK, J. W. "Two Phase Flow Measurements With Orifices". Journal Of Basic Engineering, December 1962, pp 419-433. SANCHEZ-SILVA, F. et.al. Total Mass Flowrate Measurement in Multiphase Flow by Means of a Venturi Meter. V International Conference in Multiphase Production, Cannes, June 1991. DE LEEUW, R. Liquid Correction of Venturi Meter Readings in Wet Gas Flow. North Sea Flow Measurement Workshop 97. DE LEEUW, H. Venturi Meter Performance In Wet Gas Flow. BHR Group 1997, Multiphase 1997, which are incorporated by reference for all purposes. For ease of understanding of the teachings of the present invention, a simplified the equation is used with the assumptions that the gas liquid mixture is homogenous, the Venturi is mounted horizontally, there are no frictional losses and the gas is incompressible. Accordingly, the differential pressure $\Delta P$ across the Venturi can be calculated as:

$$\Delta P = \frac{m_{TP}^2}{\rho_{TP} A_t^2}(1 - \beta^4) \qquad \text{Equation 3}$$

where, $m_{TP}$, is the total mass flow rate $m_{TP} = m_G + m_L$, $\rho_{TP}$, is the total mixture density $\rho_{TP} = \alpha \cdot \rho_G + (1-\alpha) \cdot \rho_L$ and $A_t$, is the Venturi throat cross-section area.

$\beta$—is the diameter ratio between the throat and the inlet of the Venturi.

$\alpha$—is the gas volume fraction $$\alpha = \frac{1}{1 + \frac{m_L \rho_G}{m_G \rho_L}}$$

The fluids of the gas leg 204 and the mainly liquid leg 206 combine in the leg 212 and are measured by the un-separated momentum meter 214, which can be a Venturi meter.

In the mainly liquid leg 206, the gas mass flow rate $m_{G1}$ will be:

$$m_{G1} = m_{G2} - m_{GGL} \qquad \text{Equation 4}$$

where $m_{G1}$ and $m_{G2}$ are the gas mass flow rate at the main liquid leg and un-separated leg respectively. Combining equations 2 and 4 with equation 3 for the liquid leg 206 and the combined leg 212 will yield equations 5 and 6 respectively:

$$\Delta P_1 = \frac{m_L + m_{G2} - m_{GGL}}{\rho_{TP1} A_{t1}^2}(1 - \beta_1^4) \qquad \text{Equation 5}$$

$$\Delta P_2 = \frac{m_L + m_{G2}}{\rho_{TP2} A_{t2}^2}(1-\beta_2^4) \quad \text{Equation 6}$$

where, $$\rho_{TP2} = \frac{(m_{G2}+m_L)\rho_L\rho_G}{m_{G2}\rho_L + m_L\rho_G}$$

$$\rho_{TP1} = \frac{(m_L+m_{G2}-m_{GGL})\rho_L\rho_G}{(m_{G2}-m_{GGL})\rho_L + m_L\rho_G}$$

The set of equations 5 and 6 can be solved for the liquid and gas flow rates $m_L$ and $m_{G2}$. Once the mass flow rates of the liquid and the gas are calculated, the gas void fraction in the un-separated leg 212 and the mainly liquid leg 206 can be calculated.

A water cut meter is added to one of these legs to calculate the water cut and, from the water cut, the flow rates of oil and water.

$$wc = \frac{C}{1-\alpha} \quad \text{Equation 7}$$

$$Q_w = wc*Q_L \text{ and } Q_O = (1-wc)*Q_L \quad \text{Equation 8}$$

where,

C is the water concentration measured with the water cut meter.

wc is the desire water cut.

α is the void fraction.

Q is the volumetric flow rate with the oil, water and liquid designated by the subscripts $_o$, $_w$, and $_L$ respectively.

In the above simplified equations, one can see that the density of the liquid and the gas are essential for the measurement. Other liquid properties are also very important, in particular, fluid viscosity. The iteration method of comparing the permanent pressure loss across the whole Venturi with the pressure drop across the throat enables the determination of the fluid viscosity under flowing conditions.

In reality, the Venturi equations are not so simple since many of the assumptions made are not accurate (e.g., no slip, no mixing, homogeneous flow, etc.). Measuring the gas and liquid flow rate will have errors associated to the complexity of the multiphase flow. Thus, for accurate measurements, calculations should be done without these simplifying assumptions. However, there are difficulties in developing a physical model that is accurate, of general applicability and computationally feasible. The Venturi equation can be described in more detail as follows:

$$P_{in} - P_{th} = \int_{in}^{th}\left(\frac{dp_f}{dx} + \frac{dp_a}{dx} + \frac{dp_g}{dx}\right)dx \quad \text{Equation 9}$$

where, $P_{in}$-Inlet pressure to the Venturi.

$P_{th}$-Pressure at the throat of the Venturi $\frac{dp_f}{dx}$-Differential pressure cause by friction $\frac{dp_a}{dx}$-Differential pressure cause by acceleration $\frac{dp_g}{dx}$-Differential pressure cause by gravity The above differential pressures are a function of the local flow regime, process conditions, and fluid properties and can described as follows:

$$\frac{dp_f}{dx} = F(\mu, \rho_G, \rho_L, \sigma, p, s, d) \quad \text{Equation 10}$$

$$\frac{dp_a}{dx} = F(\rho_G, \rho_L, p, s)$$

$$\frac{dp_g}{dx} = F(\rho_G, \rho_L, s, d)$$

where,

μ—Liquid viscosity

σ—Surface tension

ρ—Static pressure s—Slip ratio d—bubble size

In accordance with the present invention, one illustrative methodology for addressing the errors in the meter models is the use of a statistical correction to the model applied in the form of intelligent regression. One conventional method of multi-variable intelligent regression model currently in use is called Artificial Neural Network (ANN), which is described in "Artificial Neural Networks Paradigms, Applications And Hardware Implementation" by Edgar Sanchez-Sinencio and Clifford Lau and "Neural Networks" by Simon Haykin which are hereby incorporated by reference for all purposes.

In one application in accordance with the present invention, the ANN is used in a closed-loop mode to obtain higher accuracy in the calculation of the gas and liquid flowrates. An Artificial Neural Network model is trained (calibrated) to resolve the relation between all this measurements and the correct gas and liquid flow rate. ANNs are adapted to learn the relationship between the sensors and the behavior of each sensor within a range of flow rates, flow patterns, and fluid properties. The inputs to this intelligent regression can be all the raw measurement parameters, $\eta_i$, and their time-based derivatives, $$\frac{d\eta_i}{dt}.$$

However, the high accuracy of the ANN is reliable only within the bounds of its training dataset. It is therefore necessary that fluid properties such as density and viscosity stay within these bounds. Thus, the physical model is used to validate the fluid property values; using the flowrates calculated by the ANN as input for the physical model, the measured pressure drops are matched by iterating over the density or viscosity in the physical model equations. If the converged properties are within the specified bounds, the ANN prediction is accepted. Otherwise, the initial values are changed to remain within bounds and the iteration proceeds.

Moreover, if the input to the ANN is specified in terms of non-dimensional quantities that include the fluid properties, the roles of the physical model and the ANN can be reversed. In this alternative calculation mode, the ANN is used to solve for fluid properties while the physical model is for predicting flowrates. Again, if the fluid properties are within the specified bounds, the physical model prediction is accepted. This alternative mode of calculation is useful when the physical model in cases where the physical model is expected to be more accurate than the ANN.

A separate application of artificial neural networks for the reduction of the measurement error uses a pattern classification ANN instead of a regression ANN for implementing a flow pattern recognition system. The flow pattern recognition system uses the fluctuations of the differential pressure signal as raw input. Mathematical transforms are used for reducing this raw input to a lower-dimension feature vector that is mapped by the pattern classification ANN into one of several flow pattern categories. This detection of the flow pattern allows for the i) qualitative and/or ii) quantitative adjustment of the physical model of the flow meter used on any of the flow legs in the system to improve its accuracy. In the context of the foregoing explanation, qualitative adjustment refers to choosing among several flow-pattern-specific formulations of the mathematical model of the meter. In the same context, quantitative adjustment refers to the variation in magnitude and/or sign of numeric coefficients to refine the fit of a general mathematical formulation to the behavior of a flow meter subject to a specific flow pattern category.

The classification categories for flow pattern inside a given flow meter geometry do not directly correspond to the standard flow patterns commonly described in multiphase flow literature. For the purpose of reducing the error in calculating pressure drop, it is the pressure drop behavior what ultimately defines each category. Thus, the pressure drop model for some patterns is refined by detecting further qualitative subdivisions within a particular pattern while some standard patterns are merged into a single category with a shared mathematical model for pressure drop.

Figure 2A:
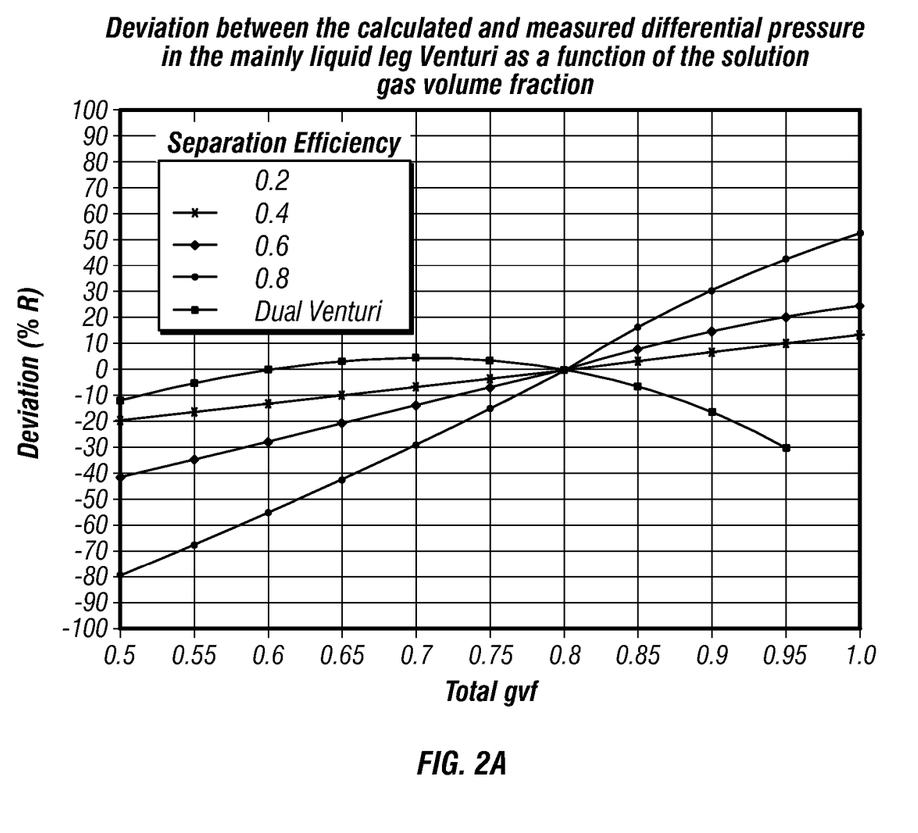
FIG. 2A is a graph illustrating the advantages provided by certain teachings of the present invention.

The following graph of FIG. 2a illustrates an example where the real gas volume fraction (GVF) is 0.8. The solution of equations 5 and 6 is the "y" axis which is the deviation between the calculated differential pressure of the mainly liquid leg Venturi, and the measured differential pressure. The x axis is the void fraction. The solution void fraction will be found when the deviation is zero (in this example GVF=0.8). This graph (2a) shows the sensitivity of the calculated differential pressure to the assumed gas-void fraction. It compares the current method to the dual dissimilar momentum meter method described in Paul Daniel, Mark D. Tudge, Jonathan Lund "A Venturi based wet gas meter with on line gas mass fraction estimation" 18th NORTH SEA FLOW MEASUREMENT WORKSHOP 2000 and Patent number US2004/0182172a1 "multiphase flow meter using multiple pressure differentials", which are hereby incorporated by reference for all purposes. It shows that the approach suggested here is more sensitive and therefore the solution for the GVF will be more accurate. It also shows that the dual momentum meter approach does not have a unique solution which can yield to a very large error. The graph also shows that higher separation efficiency will give higher accuracy. In other words, the graph of FIG. 2a shows that using two momentum meters as described herein will provide more accurate results than using two dissimilar momentum meters without partial separation. This is due to the equations in the proposed system being much less interdependent.

As explained above, one advantage of the teachings of the present invention is the ability to check and correct the reading of a meter. It was also explained how to correct and find the errors associated with the low efficiency of the diverter. In addition, corrections can be applied to the instrumentation errors that are a consequence of unknown fluid properties (e.g., densities, viscosities, etc.), and insufficient ability to accurately model the pressure drop in real life multiphase flow.

In addition to the above techniques, fluid properties can be measured using commercially available on-line sampler devices. The flow measurement is affected by changes in fluid properties, mainly viscosity and density. Prior knowledge of these properties is a requirement. These properties are determined by the operator based on analysis of the fluid in the laboratory or by using an on-line auto-sampler that is connected to the gas line. The advantages of using the auto-sampler on the gas line are: (i) it can be used as a secondary liquid separator and therefore higher quality gas will enter the gas meter, and (ii) the gas line carries a very small amount liquid and therefore filling the sampler vessel will take a relatively long time, which makes it easier to accurately analyze the sample. The sampler can also include a water cut meter. Conversely, measuring water cut in the liquid only phase of the sampler will yield higher accuracy in the water cut measurement at high gas-void fraction conditions.

The arrangement of FIG. 2 is merely one exemplary arrangement on which the teachings of the present invention can be applied.

Figure 3:
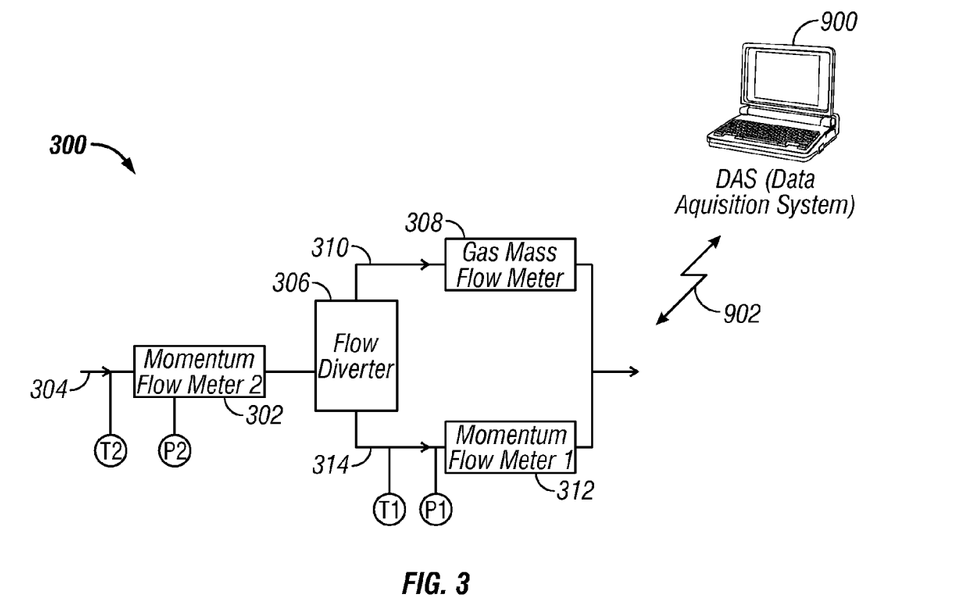
FIG. 3 schematically illustrates an exemplary system in accordance with the present invention wherein two phase flow of liquid and gas is measured using a momentum meter upstream the system on an un-separated leg, a fluidic flow diverter downstream to the un-separated leg, a gas meter on a gas leg, and a momentum meter on a mainly liquid leg.

Referring now to FIG. 3, there is shown a system 300 for measuring two phase flow of liquid and gas using a momentum meter 302 upstream of the system 300 on an un-separated leg 304, a fluidic flow diverter 306 downstream to the un-separated leg 304, a gas meter 308 on the gas leg 310, and a momentum meter 312 on a mainly liquid leg 314.

Figure 4:
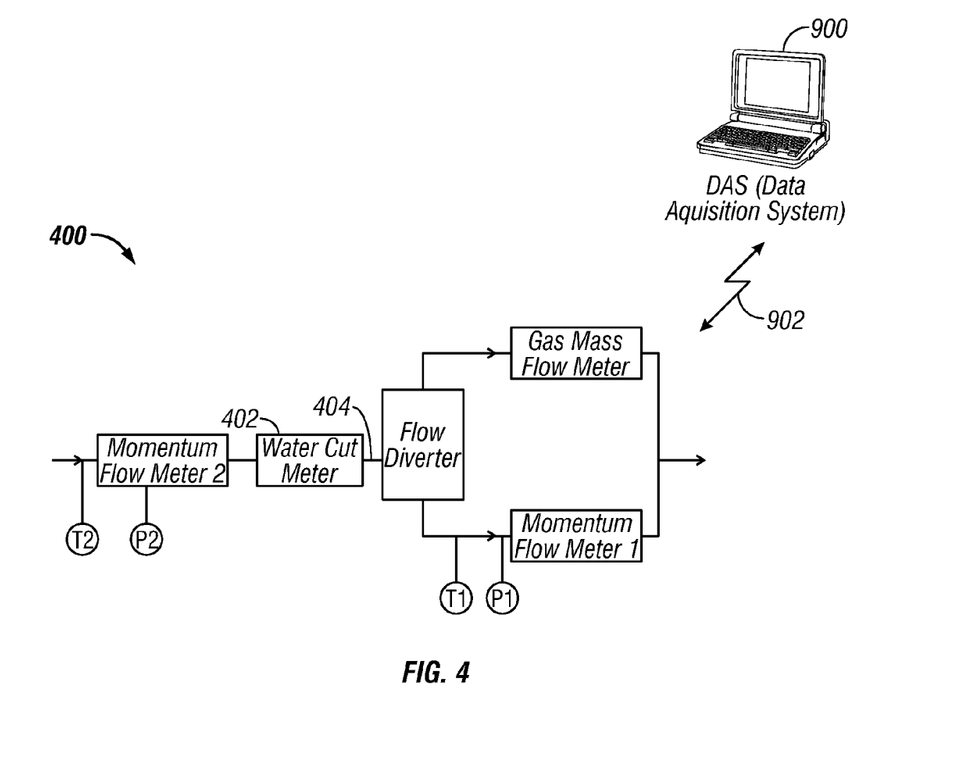
FIG. 4 schematically illustrates an exemplary system in accordance with the present invention wherein three phase flow of oil water and gas is measured by adding a water cut meter to the two phase meter as explained in FIGS. 1 and 2.

Referring now to FIG. 4, there is shown a system 400 for measuring three phase flow of oil water and gas by adding a water cut meter to the two phase meter as described in connection with FIGS. 1 and 2. In FIG. 4, a water cut meter 402 is located on an un-separated leg 404 where the gas volume fraction is low and therefore an accurate water cut measurement can be performed. [in the disclosure, stated meter was in the mostly liquid leg]

Figure 5:
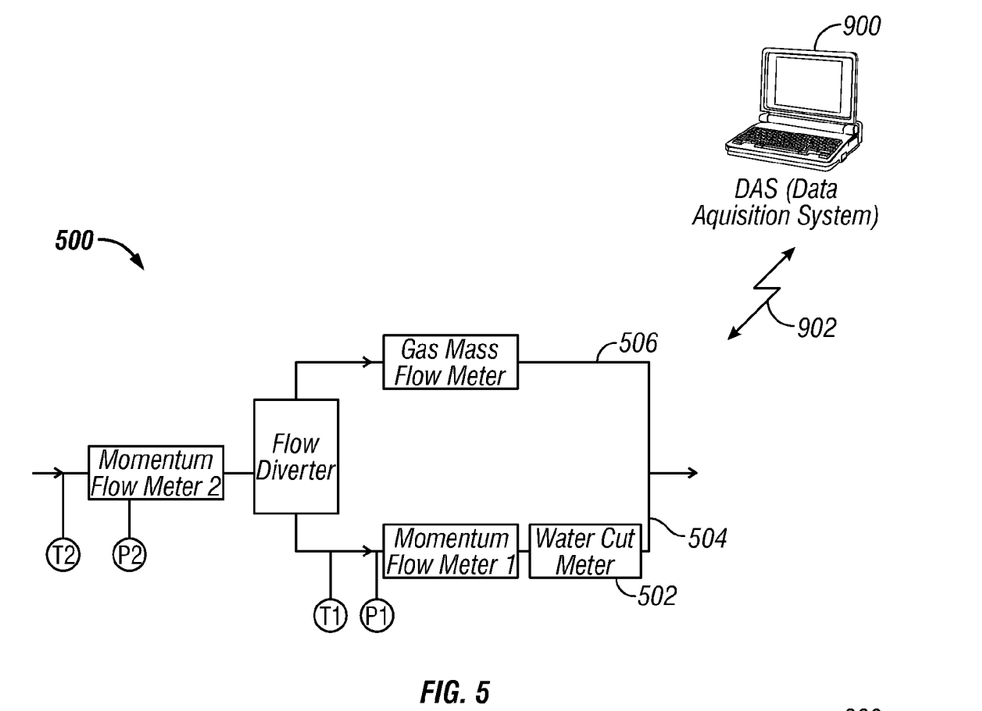
FIG. 5 schematically illustrates another exemplary system in accordance with the present invention wherein three phase flow of oil water and gas is measured by adding a water cut meter to the two phase meter as explained in FIGS. 1 and 2.

Referring now to FIG. 5, there is shown another system 500 for measuring three phase flow of oil water and gas by adding a water cut meter to the two phase meter as described in connection with FIGS. 1 and 2. In FIG. 5, a water cut meter 502 is located on a mainly liquid leg 504. Although the gas volume fraction (GVF) in the mainly liquid leg 504 is lower than in a mainly gas leg 506, the integrity of GVF measurement on the mainly liquid leg 504 is higher than at the mainly gas leg 506 and therefore an accurate measurement of water-cut can be performed.

Figure 6:
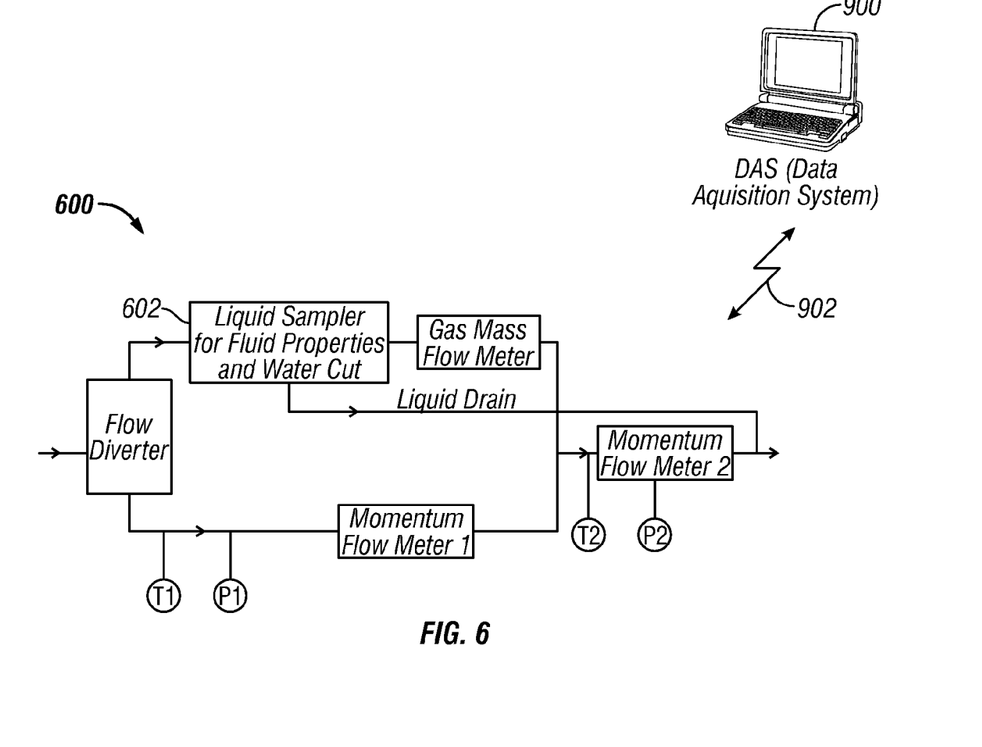
FIG. 6 schematically illustrates an exemplary system in accordance with the present invention wherein three phase flow of oil water and gas is measured by adding a water cut meter to the two phase meter as explained in FIGS. 1 and 2 and by adding an automatic sampler.

Referring now to FIG. 6, there is shown another system 600 for measuring three phase flow of oil water and gas with the two phase meter as described in connection with FIGS. 1 and 2 and with an automatic sampler 602. The automatic sampler 602, which is commercially available, can measure fluid properties and water cut. These values can be used in the momentum meter physical model to determine the flow rates of the oil and water.

Figure 7:
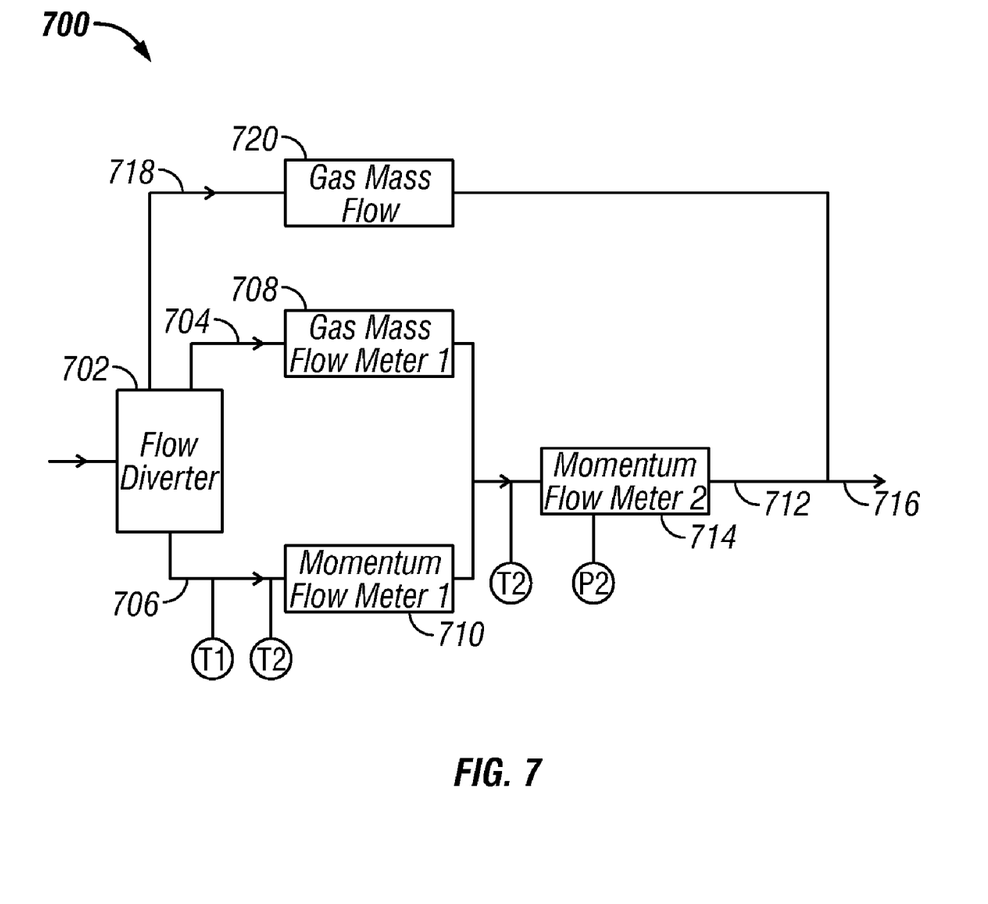
FIG. 7 schematically illustrates an exemplary system in accordance with the present invention wherein the mainly gas leg is split into a main gas leg and a bypass gas leg with the objective of increasing the accuracy of the flow rate measurements for lines carrying high gas void fraction fluid streams.

Referring now to FIG. 7, there is shown another system 700 for measuring two phase flow of liquid and gas where the system in FIG. 2 is modified by splitting the mainly gas stream into a main gas leg 704 with its corresponding gas mass flow meter 708 and a bypass gas leg 718 with its corresponding gas mass flow meter 720. This configuration increases the accuracy of the flow rate measurements for high GVF applications by i) adding only enough gas to the combined leg 712 to reduce the interdependency between the equations for momentum meters 710 and 714 and ii) measuring the excess gas in a bypass leg 720 that is finally commingled with the combined leg 712 at the system outlet. This configuration keeps the GVF in the combined leg low enough to detect its liquid flow rate accurately but sufficiently different from the mainly liquid leg GVF to have truly independent equations.

Figure 8:
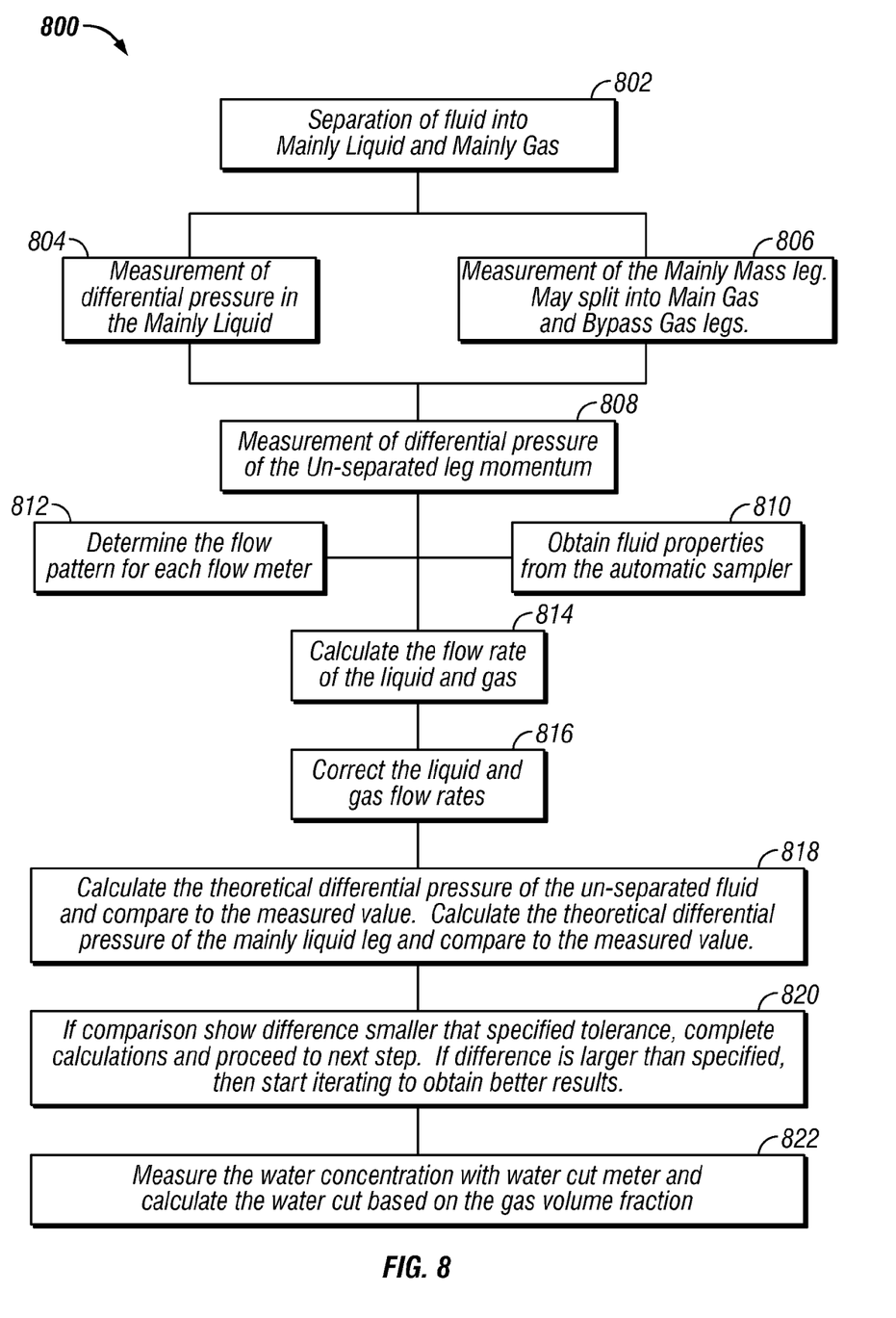
FIG. 8 shows a block diagram illustrating one methodology for correcting flow meter readings in accordance with the present invention.

Referring now to FIG. 8, there is shown one illustrative methodology 800 for correcting flow meter measurements according to one embodiment of the present invention. At step 802, there is a partial separation of a fluid into two streams, a mainly liquid stream and a mainly gas stream. At step 804, a measurement of the differential pressure in the mainly liquid stream is taken by a suitable meter such as a momentum meter. At step 806, a measurement is taken of the mainly gas mass flow. At step 808, a measurement of the differential pressure of a combined flow stream such as an un-separated leg is taken by a suitable meter such as a momentum meter. At step 810, measurements of one or more fluid properties are taken by a suitable automatic sampler. At step 812, the flow regime pattern is determined using an intelligent pattern classification algorithm; based on the classification algorithm output, the calculations for the flow meters are adapted qualitatively and quantitatively to better fit the detected flow pattern. At step 814, a calculation of the flow rate of the liquid and gas is made based on the measurements taken in the previous steps. At step 816, a correction of the liquid and gas flow rates is made using appropriate software that implements a multi variable regression algorithm. At step 818, a calculation of the theoretical differential pressure of the un-separated momentum flow meter is made and compared to the measured value at step 808. Also, a calculation of the theoretical differential pressure of the mainly liquid stream is compared to the measured value from the momentum flow meter. At step 820, if the difference between the theoretical value and the measured value is smaller than a specified tolerance (or error), the calculations are concluded. If the difference or error is larger than specified, then iteration is initiated until the difference is within the specified tolerance. At step 822, measurement of water concentration is made with a water cut meter and a calculation of the water cut is made based on the previously calculated gas volume fraction.

Any gas mass flow meter that is accurate enough to measure a mainly gas stream with quality of 95% will be sufficient. The combination of a temperature sensor, a pressure sensor and a vortex meter is a suitable flow meter for this application.

Additionally, it should be appreciated that the methodologies described above can be employed in various arrangements. For example, referring now to FIGS. 2-7, a data acquisition system 900 can communicate via a communication link 902 to any or all of the meters and equipment disclosed in the figures. The system 900 can be a general purpose data processor having suitable known hardware such as memory modules, processing modules having pre-programmed instructions, etc. The communication link 902 can have one-way or bidirectional data transfer and can include conductors such as electrical wires or fiber optic cables or it can use wireless communication via radio waves. It should be understood that the data acquisition system 900 is merely illustrative of equipment suited to utilize the teachings of the present invention and that the present invention is not limited to any particular type of data processor or communication equipment.

Terms such as substantially similar, intrinsically similar and fundamentally similar sensors or devices are intended to general describe devices that basically measure the same physical phenomena. For example, a mercury thermometer measures temperature by quantifying or measuring the expansion of a volume of fluid. A bellow filled with oil can also measure temperature. Another example includes an orifice plate, venturi, pitot tube, etc., which all use differential pressure across a restriction.

The foregoing description is directed to particular embodiments of the present invention for the purpose of illustration and explanation. It will be apparent, however, to one skilled in the art that many modifications and changes to the embodiment set forth above are possible without departing from the scope of the invention. Thus, it is intended that the following claims be interpreted to embrace all such modifications and changes.

What is claimed is:

1. A method for measuring flow of a multiphase fluid having a plurality of components, comprising:
measuring the flow of the fluid using at least three flow meters, wherein at least one of the flow meters measures a total flow of at least two of the flow meters;
causing a different flow regime to pass through the at least two of the flow meters; and
correcting an error associated with at least one of the flow measurements of the flow meters.

2. The method of claim 1 further comprising separating the fluid into a mainly gas leg and a mainly liquid leg using a separator, the separation causing a different gas volume fraction flowing through each flow meter, which thereby increases a difference in a measured flow characteristic.

3. The method of claim 2 wherein an independent flow-equation is determined from measurement made at one of: (i) an un-separated leg carrying the fluid upstream of the separator; and (ii) a combined leg carrying the fluid downstream of the separator.

4. The method of claim 3 wherein at least one of the flow meters is located at one of (i) downstream of the separator, and (ii) upstream the separator.

5. The method of claim 2 wherein no pumps are used to cause significantly different void fractions flowing through each leg.

6. The method of claim 1 wherein the fluid is made up of at least two mostly immiscible fluids.

7. The method of claim 6 wherein the plurality of fluid components includes one of: (i) gas, (ii) oil and (iii) water.

8. The method of claim 1 wherein an independent flow equation determined for each of the flow meters is solved by an iteration process where a solution from an intelligent regression model is validated against a converged fluid property value obtained from at least one physical model of the flow meters.

9. The method of claim 1 wherein an independent flow equation determined for each of the flow meters is solved by an iteration process where at least one converged fluid property value obtained from at least one physical model of the flow meters is validated against at least one solution from at least one intelligent regression model.

10. The method of claim 1 further comprising: measuring a secondary parameter; and reducing an error in a measured flow rate using the measured secondary parameter.

11. The method of claim 10 wherein the secondary parameter is a fluctuation of a differential pressure signal that is mathematically reduced to a low-dimension input vector for an intelligent pattern classification algorithm.

12. The method of claim 10 wherein the secondary parameter is a differential pressure across a fluid measurement meter and the error is reduced by compensating for the effect of frictional losses associated with at least one of the flow meters.

13. The method of claim 1 further comprising: separating the fluid into a mainly gas leg and a mainly liquid leg using a separator; and positioning a secondary flow meter in each flow leg to determine a flow of a gas and a liquid.

14. The method of claim 13 wherein the secondary flow meter is selected from a group consisting of (i) a momentum meter, (ii) a mass flow meter, and (iii) a volumetric flow meter.

15. The method of claim 1 further comprising: separating the fluid into a mainly gas leg and a mainly liquid leg using a separator; and measuring a water cut in at least one of: (i) the liquid leg, (ii) the gas leg, (iii) a third leg having an unseparated fluid; and (iv) a fourth leg having a combined liquid.

16. The method of claim 1 further comprising: separating the fluid into a mainly gas leg and a mainly liquid leg using a separator; and positioning an auto-sampling device in the gas leg to measure at least one fluid property; and correcting measured flow rates using the measured at least one fluid property.

17. The method of claim 1, further comprising the determining a plurality of physical behaviors of the at least three flow meters, the plurality of physical behaviors each having an associated error.

18. The method of claim 17 wherein the plurality of physical behaviors includes a flow pattern that is detected using an intelligent pattern classification algorithm and the associated errors are compensated in a mathematical formulation of each flow meter.

19. The method of claim 1 further comprising: separating the fluid into a mainly gas leg and a mainly liquid leg using a separator; and splitting the mainly gas leg from the separator into a second gas leg and a bypass gas leg to increase accuracy of the measured flow rates in high GVF applications.

20. The method of claim 1 wherein at least two of the flow meters are substantially similar.

* * * * *